United States Patent
Webber

[15] 3,674,784
[45] July 4, 1972

[54] 3-FORMYL CEPHALOSPORIN SULFOXIDES

[72] Inventor: J. Alan Webber, Indianapolis, Ind.
[73] Assignee: Eli Lilly and Company, Indianapolis, Ind.
[22] Filed: July 27, 1970
[21] Appl. No.: 58,678

[52] U.S. Cl. .................................260/243 C, 424/246
[51] Int. Cl. .................................................C07d 99/24
[58] Field of Search ....................................260/243 C

[56] References Cited
UNITED STATES PATENTS 3,351,596  11/1967  Chamberlin.................260/243 C
3,275,626  9/1966   Morin et al..................260/243 C

*Primary Examiner*—Nicholas S. Rizzo
*Attorney*—Everet F. Smith and John T. Reynolds

[57] ABSTRACT

3-Formyl cephalosporin sulfoxide esters which are useful as intermediates in the preparation of new cephalosporin antibiotics.

11 Claims, No Drawings

3,674,784

3-FORMYL CEPHALOSPORIN SULFOXIDES

INTRODUCTION

This invention relates to new cephalosporin sulfoxide esters. More particularly, this invention provides new 3-formyl 7-acylamido-Δ3-cephalosporin sulfoxide esters. These esters are of interest for their use as stable intermediates for the production of new cephalosporin antibiotics.

BACKGROUND OF THE INVENTION a. General Cephalosporin History

Cephalosporin C, obtained by fermentation, has been defined as having the following structure:

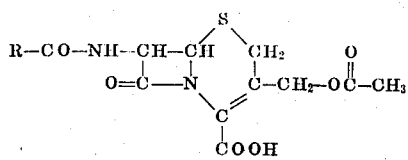

where R is $HOOC-CH(NH_2)-(CH_2)_3-$. It is also known as 7-(5'-aminoadipamido)cephalosporanic acid. It has weak antibiotic activity, but it is important as a source of cephalosporin C nucleus, i.e., 7-aminocephalosporanic acid (7-ACA), having the structural formula

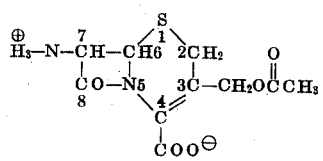

shown here in zwitterionic form, although anionic and cationic salts may be formed and used. Antibiotics such as cephalothin and cephaloridine are prepared from 7-ACA by known methods. Various derivatives of 7-ACA based antibiotics are made by acylating the 7-amino group of 7-ACA with appropriate acyl groups and/or by replacing the acetoxy group attached to the 3-methyl carbon atom with appropriate nucleophilic groups now well documented in the literature.

In continued research, desacetoxycephalosporin compounds, i.e., compounds of the structure

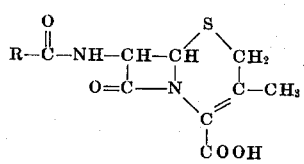

where R is the residue of the acyl group have been prepared. An important known antibiotically active compound in this class is cephalexin, an orally active cephalosporin antibiotic. Morin and Jackson (U.S. Pat. No. 3,275,626) discovered a process for preparing the desacetoxycephalosporanic acid derivatives by rearranging a penicillin sulfoxide ester to the corresponding desacetoxycephalosporin ester, and then removing the ester group. Desacetoxycephalosporanic acid derivative antibiotics are thus obtainable from a penicillin starting material. The compounds are sometimes, for convenience, referred to as being derivatives of 7-aminodesacetoxycephalosporanic acid (7-ADCA) having the structure

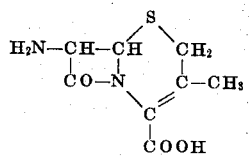

b. 3-Formyl Cephalosporin Prior Art

In U.S. Pat. No. 3,351,596, issued Nov. 7, 1967, James W. Chamberlin disclosed and claimed a process for preparing 3-formylcephalosporin esters comprising the reaction of a 3-hydroxymethyl-7-acylamido-3-cephem-4-carboxylic acid compound with a diazo compound to obtain the ester, and then reacting that ester with an oxidizing agent selected from the group consisting of manganese dioxide and chromium trioxide.

However, the products of that reaction are 3-formyl-cephalosporin esters having the sulfur in the 1-position in the bivalent or sulfide state. Those products, are obtained in poor yields and, in addition, are rather unstable to chemical conditions contemplated for further reaction. Those in the art are thus in need of new stable compounds which can be used as intermediates for a variety of chemical reaction in efforts to find new antibiotic compounds and economical processes for obtaining them.

SUMMARY OF THE INVENTION

According to this invention, I have found that new, stable 3formyl cephalosporin sulfoxide esters can be prepared in good yields by reacting an oxidizing agent with a 3-hydroxymethyl-7-(N-protected amino)-3-cephem-4-carboxylate-1-oxide ester in a substantially anhydrous organic liquid medium which does not interfere with the desired reaction, at temperatures above the freezing point of the mixture to about 50° C. until the 3-formyl-7-(N-protected amino)-3-cephem-4-carboxylate-1-oxide product is formed. These new 3-formyl cephalosporin sulfoxide esters are more stable to various chemical reagents, e.g., basic reagents, than the 3-formyl cephalosporin sulfide esters disclosed by Chamberlin. They can be obtained in better yields than those prior products. They can be easily reduced to the sulfide state and deesterified to obtain the corresponding 3-formyl cephalosporin acid derivative compounds by methods now known. The 3-formylcephalosporin acid derivatives having a 7-acylamido group are active antibiotics against a variety of Gram positive and Gram-negative organisms. However, the 3-formylcephalosporin sulfoxide esters of this invention are of more interest for their use as intermediates in chemical process routes to known and new cephalosporin antibiotically active compounds.

DETAILED DESCRIPTION OF THE INVENTION

The new compounds of this invention may be defined by the chemical formula

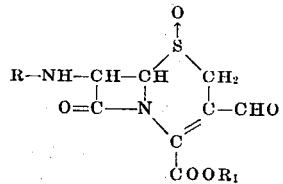

wherein R is a $C_1$ to $C_6$-alkanoyl, or an acyl group of the formula

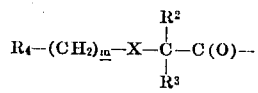

wherein $m$ in an integer of from 0 to 4, X is oxygen, sulfur, or a chemical bond, $R^2$ and $R^3$ are, separately, hydrogen or methyl, or $R^2$ is hydrogen when $R^3$ is an amino protected with benzyloxycarbonyl, tert-butoxycarbonyl or the enamine from methyl acetoacetate, or the like, $R^4$ is thienyl, phenyl, or phenyl substituted with fluorine, chlorine, bromine, iodine, hydroxy, methyl, ethyl, methoxy, ethoxy, nitro, cyano or trifluoromethyl, singly or a combination.

$R^1$ is
a $C_4$ to $C_6$-tert-alkyl
a $C_5$ to $C_7$-tert-alkenyl
$C_5$ to $C_7$-tert-alkynyl 2,2,2-trichloroethyl
benzyl
benzhydryl
methoxybenzyl
nitrobenzyl
phenacyl
phthalimidomethyl, or
succinimidomethyl.

The compounds of this invention can be prepared by reacting an N-protected 7-aminocephalosporanate sulfoxide ester, e.g., a 7-acylamido-3-hydroxymethyl-Δ³-cephalosporin sulfoxide ester wherein the acyl group is as defined above, with an oxidizing agent in a substantially anhydrous organic liquid medium at temperatures about the freezing point of the mixture to about 50° C. until the 3-formyl cephalosporin sulfoxide compound is formed. Oxidizing agents which can be used in this process include chromium trioxide, manganese dioxide, dichlorodicyanoquinoline (DDQ), nickel peroxide and the like. We prefer to use chromium trioxide, particularly chromium trioxide in sulfuric acid-water, commonly referred to as Jones reagent [Fiezer and Fiezer, Reagents for Organic Synthesis, Vol. 1, page 142, John Wiley and Sons, Inc. (1967)]. Also, we sometimes use chromium trioxide in acetic acid or in N,N-dimethylformamide.

The 3-hydroxymethyl 7-(N-protected amino)-Δ³-cephem-4-carboxylate-1-oxide ester reactant is reacted with the oxidizing agent in an amount sufficient to convert the 3-hydroxymethyl 7-(N-protected amino)-Δ³-cephem-4-carboxylate-1-oxide ester to the 3-formyl compound. The mixture of the reactants in a substantially anhydrous inert organic liquid medium is preferably agitated or stirred to insure intimate contact of the reactants and to shorten the reaction time. A reaction time of from 10 minutes to 12 hours is generally sufficient to insure substantial completion of the reaction.

The 3-hydroxymethyl-Δ³-cephalosporin sulfoxide ester starting materials can be prepared by a variety of methods. They can be prepared by treating with water the corresponding 3-halomethyl-Δ²-cephalosporin ester dissolved in a mixture of dimethylsulfoxide and an organic aprotic diluent such as benzene, ethyl acetate, methylene chloride, or the like, to form the 3-hydroxymethyl-Δ²-cephalosporin ester, and then oxidizing the 3-hydroxymethyl-Δ²-cephalosporin ester to the 3-hydroxymethyl-Δ³-cephalosporin sulfoxide ester by known methods. The water content in the mixture should be at least equivalent to the halide content of the 3-halomethyl-Δ²-cephalosporin ester. For example, p-methoxybenzyl 3-hydroxymethyl-7-phenoxyacetamido-Δ³-cephem-4-carboxylate-1-oxide can be prepared by reacting p-methoxybenzyl-3-bromomethyl-7-phenoxyacetamido-Δ²-cephem-4-carboxylate with 10 molar equivalents of water (relative to the 3-bromomethyl compound) in a 1:1 v/v mixture of benzene and dimethyl sulfoxide, followed by treatment with 85 percent m-chloroperbenzoic acid in a mixture of isopropyl alcohol and methylene chloride.

These starting materials can also be prepared by enzymatic deacetylation of the corresponding 7-acylamido-3-acetoxymethyl-Δ³-4-carboxylate-1-oxide esters by known methods, e.g., with orange peel esterase. They can also be prepared by oxidizing with m-chloroperbenzoic acid or other peracid oxidizing agent the 7-acylamido-3-hydroxymethyl-Δ³-cephem-4-carboxylate esters disclosed in Belgian Pat. publication No. 734,532, published Dec. 16, 1969, in which the X' radical is a protected amino group, or the 7-(2'-thienylacetamido)-3-hydroxymethyl-Δ³-cephem-4-carboxylate esters in Belgian Pat. publication No. 719,710, published Feb. 20, 1969.

The 3-formyl cephalosporin sulfoxide ester compounds of this invention can be reduced to the sulfide state by methods now known. For example, the 3-formyl cephalosporin sulfoxide ester, the reducing agent, and the activating agent, if needed, can be mixed in a liquid medium at a temperature of from about −20° C. to about 100° C. until the reduced cephalosporin acid or ester is obtained.

According to one reduction procedure, the Δ³-cephalosporin sulfoxide ester is treated or reacted with certain reducing agents such as (a) stannous, ferrous, cuprous, or manganous cations, which can be supplied in the form of various commonly known inorganic and organic compound forms which have some solubility in the liquid medium used; (b) dithionite ($s_2O_4$), iodide, or ferrocyanide anions, which can also be supplied (in the form of inorganic or organic salt forms); (c) trivalent phosphorus compounds having a molecular weight below about 500; (d) a halosilane compound of the formula

wherein X is chlorine, bromine, or iodine, and each of $R^1$ and $R^2$ is hydrogen, chlorine, bromine, iodine, or a hydrocarbon radical free from aliphatic unsaturation and having from 1 to 8 carbon atoms, or similar radicals known to those skilled in the art, in the presence of an acid halide of an acid of carbon, sulfur, or phosphorus, which acid halide is inert to reduction by the reducing agent, and which acid halide has a second order hydrolysis constant equal to or greater than that of benzoyl chloride, in a substantially anhydrous liquid medium, at a temperature of from about −20° C. to about 100° C. to form a Δ³-cephalosporin ester.

According to a second form or aspect of that reduction process, the reduction may be conducted in the absence of the externally supplied acid halide activator. In that embodiment, the Δ³-cephalosporin sulfoxide ester is treated or reacted with a reducing agent from the group consisting of (1) a trivalent phosphorus compound having at least one chlorine, bromine, or iodine bonded to the trivalent phosphorus atom, any remaining valences of the trivalent phosphorus atom being satisfied by a —hydrocarbon, —O-hydrocarbon, —S-hydrocarbon radical which is free of aliphatic unsaturation and has from 1 to 8 carbon atoms, or such —hydrocarbon, —O-hydrocarbon, and —S-hydrocarbon radicals substituted with chlorine or bromine; and a halosilane compound of the formula

wherein X is chlorine, bromine, or iodine, and each of $R^1$ and $R^2$ is hydrogen, chlorine, bromine, iodine, or a hydrocarbon radical free of aliphatic unsaturation having from 1 to 8 carbon atoms, and in a substantially anhydrous liquid medium under temperature conditions described above.

The new 3-formyl-cephalosporin sulfoxide esters of this invention are capable of the same reactions associated with aldehyde groups indicated in U.S. Pat. No. 3,351,596. These new sulfoxide aldehyde esters can be reacted with alcohols, thiols, or glycols to obtain the corresponding acetal, thioacetal, or dioxanyl compounds, respectively. They react with semi-carbazide to form the corresponding semicarbazone. They form additional salts with sodium bisulfite. They form oximes with hydroxylamines. Some of those compounds become new antibiotics upon reduction of the sulfoxide group, and removal of the esters. The new 3-formyl cephalosporin sulfoxide esters also form cyanohydrins by reaction with hydrogen cyanide.

The selection of the ester groups which are used in the starting 3-hydroxymethyl-7-acylamido-Δ³-cephem-4-carboxylate-1-oxide ester materials and which appear in the corresponding 3-formyl-7-acylamido-Δ³-cephem-4-carboxylate-1-oxide ester products of this invention is determined to some extent by the use intended for the ester product. When it is desired to effect sulfoxide reduction and then remove the ester group to obtain a 3-formyl cephalosporin acid, the ester group is preferably one which can be removed by treatment of the product with an acid such as formic acid or with trifluoroacetic acid for a time sufficient to remove the ester group and to form the corresponding 3-formyl-7-acylamido-Δ³-cephem-4-carboxylic acid. For this purpose, the ester group selected would probably be one like tert-butyl, p-methoxybenzyl, benzhydryl, or the like. However, where the products of this invention are to be subjected to a further series of reactions, e.g., to transform the 3-formyl group into an appropriate derivative, effect sulfoxide reduction, then to cleave the 7-acylamido group to the 7-amino state, followed by reacylation of the 7-amino group with a desired acyl group, and by ester group removal operations, the choice of ester is usually one which is stable to those intermediate chemical steps, and which can be readily removed later by the use of the numerous mild conditions available in the art, such as by the use of formic or trifluoroacetic acid, zinc in acetic or hydrochloric acid, or by hydrogenation in the presence of conventional hydrogenation catalysts.

After reduction of the sulfoxide group and removal of the ester group by methods referred to above, the products are useful as antibiotics directly. For example, 3-formyl-7-(2'-thienylacetamido)-3-cephem-4-carboxylic acid, which is an antibiotically active compound, can be prepared conveniently from the products of this invention by reduction of the sulfoxide and ester group removal steps.

The new 3-formyl-cephalosporin sulfoxide esters of this invention can be used as stable intermediates for the production of a variety of new cephalosporin antibiotically active compounds which have not previously been obtainable. Thus, for example, the 3-formyl-cephalosporin sulfoxide esters of this invention are preferably first treated with a reagent which reacts with the 3-formyl group to form the desired derivative thereof, after which the sulfoxide can be reduced to the sulfide or bivalent state, the 7-acyl group can be removed and replaced with any desired acyl group, and the ester group can be removed by methods known in the art for each step to obtain the desired cephalosporin antibiotic compound.

For example, a 3-formyl-7-acylamido-Δ³-cephem-4-carboxylate-1-oxide ester of this invention can be reacted with a $C_1$ to $C_6$-alkyloxyamine, or salt thereof, to form the corresponding 3-($C_1$ to $C_6$-alkoxyiminomethyl)-7-acylamido-3-cephem-4-carboxylate-1-oxide. The sulfoxide ester can be reduced, e.g., with a stannous chloride/acetyl chloride mixture, and the ester group can be removed with formic acid to form the corresponding 3-($C_1$ to $C_6$-alkyloximinomethyl)-7-acylamido-Δ³-cephem-4-carboxylic acid. Thus, 3-methoxyiminomethyl-7-phenoxyacetamido-Δ³-cephem-4-carboxylic acid has demonstrated antibiotic activity against penicillin G resistant Staphylococcus aureus in the range of about 0.3 to 0.4 mg./ml. in a gradient plate test.

A few examples of compounds of this invention, which can be prepared by the procedures described above, as illustrated by the detailed examples which follow, are given here.

tert-butyl 3-formyl-7-phenoxyacetamido-Δ³-cephem-4-carboxylate-1-oxide, tert-butyl 3-formyl-7-(2'-thienylacetamido)-Δ³-cephem-4-carboxylate-1-oxide, tert-pentynyl 3-formyl-7-phenylacetamido-Δ³cephem-4-carboxylate-1-oxide, 2,2,2-trichloroethyl 3-formyl-7-phenylisopropionamido-Δ³-cephem-4-carboxylate-1-oxide, p-nitrobenzyl 3-formyl-7-phenylmercaptoacetamido-Δ³-cephem-4-carboxylate-1-oxide, benzhydryl 3-formyl-7-phenylbutanoylamido-Δ³-cephem-4-carboxylate-1-oxide, p-methoxybenzyl 3-formyl-7-benzyl-oxyacetamido-Δ³-cephem-4-carboxylate-1-oxide phthalimidomethyl 3-formyl-7-(4'-nitrophenylacetamido)-Δ³-cephem-4-carboxylate-1-oxide, succinimidomethyl 3-formyl-7-(3'-chlorophenyl-tert-butanoylamido)-Δ³-cephem-4-carboxylate-1-oxide, benzhydryl 3-formyl-7-[D-α-(benzyloxycarbonylamino)-α-(3'-hydroxyphenyl)acetamido]-Δ³-cephem-4-carboxylate-1-oxide, tert-butyl 3-formyl-7-[D-α-(tert-butoxycarbonylamino)-α-phenylacetamido]-Δ³-cephem-4-carboxylate-1-oxide, benzhydryl 3-formyl-7-hexanoylamido-Δ³-cephem-4-carboxylate-1-oxide, 2,2,2-trichloroethyl 3-formyl-7-(4'-cyanophenylacetamido)-Δ³-cephem-4-carboxylate-1-oxide, tert-pentyl 3-formyl-7-(4'-trifluoromethylphenoxyacetamido)-Δ³-cephem-4-carboxylate-1-oxide, tert-hexyl 3-formyl-7-(3'-methoxyphenylpropionamido)-Δ³ cephem-4-carboxylate-1-oxide, p-nitrobenzyl 3-formyl-7-(3'-hydroxyphenylacetamido)-Δ³-cephem-4-carboxylate-1-oxide, tert-butyl 3-formyl-7-[2'-(2''-methoxycarbonyl-1-methylvinylamino)-2'-phenylacetamido]-Δ³-cephem-4-carboxylate-1-oxide.

Specific starting materials, intermediates, and products of the process of this invention are named, for convenience, by use of the "cepham" nomenclature system which has been adapted to cephalosporin compounds from an analogous nomenclature system, based on "penam" for naming specific penicillin compounds. "Penam" nomenclature for the penicillins is described by Sheehan, Henery-Logan, and Johnson in the Journal of American Chemical Society (JACS), 75, 3292, footnote 2 (1953), and has been adapted to the cephalosporins by Morin et al. in JACS, 84, 3400 (1962). In accordance with these systems of nomenclature, "penam" and "cepham" refer respectively to the following saturated ring systems

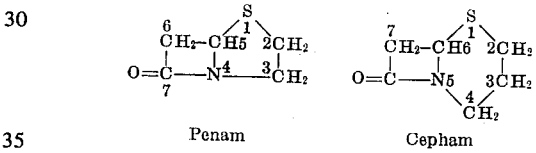

Penam          Cepham

"Cephem" refers to the cepham ring structure containing a double bond, the position of which is indicated by the prefix "Δ" with an integer superscript denoting the lowest numbered carbon atom to which the double bond is connected, or by the word "delta" with the same number relationship. Often a number immediately preceding the word "cephem" is used by itself to indicate the position of the double bond in the "-cephem" structure. A 3-formyl-cephalosporin sulfoxide ester obtained by this invention can be named 2,2,2-trichloroethyl 3-formyl-7-phenoxyacetamido-3-cephem-4-carboxylate-1-oxide.

The invention is further illustrated by the following detailed examples.

EXAMPLE 1 tert-Butyl 3-formyl-7-phenoxyacetamido-3-cephem-4-carboxylate-1-oxide

To a cooled solution of 800 mg. of t-butyl 3-hydroxymethyl-7-phenoxyacetamido-3-cephem-4-carboxylate-1-oxide in 200 cc. of acetone was added 3 cc. of Jones reagent (26.72 gm. $CrO_3/100$ cc $H_2SO_4$ solution). After 10 minutes stirring in the cold, the reaction mixture was evaporated to a small volume, diluted with ethyl acetate, and washed twice with saturated sodium chloride solution, twice with saturated sodium bicarbonate solution, once more with sodium chloride solution, dried over magnesium sulfate, filtered and evaporated to give 776 mg. of a pale yellow foam. This material was chromatographed on silica gel-15 percent water. Elution with benzene-10 percent ethyl acetate gave a material which crystallized from ether, m.p., 147°–149° C., infrared (IR), ultraviolet (UV [λmax 298 (26,200), 375 (7600)], and nuclear magnetic resonance (NMR) spectrum were in accord with assigned structure for the title compound.

Analysis, Calc.: C, 55.20; H, 5.11; N, 6.45.
Found: C, 55.56; H, 5.37; N, 6.18.

EXAMPLE 2 t-Butyl-3-methoxyiminomethyl-7-phenoxyacetamido-3-cephem-4-carboxylate-1-oxide

To a solution of 165 mg. (about 0.4 mM) of the sulfoxide aldehyde ester, tert-butyl 3-formyl-7-phenoxyacetamido-3-cephem-4-carboxylate-1-oxide, in 3 cc. ethanol was added five drops of pyridine and then 34 mg. of methoxyamine hydrochloride. A thick, white precipitate soon appeared and was collected to give 100 mg. of the O-methyl oxime [title compound], m.p., 201°–204° C.; the IR, UV, and NMR spectra of the compound was consistent with the assigned structure. An analytic sample, recrystallized from ethanol, had a melting point of 207°–210° C.

Analysis, Calc.: C, 54.41; H, 5.43; N, 9.06.
Found: C, 54.37; H, 5.71; N, 8.84.

EXAMPLE 3 t-Butyl 3-methoxyiminomethyl-7-phenoxyacetamido-3-cephem-4-carboxylate

To a cooled solution of 667 mg. of the O-methyl oxime sulfoxide ester of Example 2 in 25 cc. of 4:1 acetonitrile:dimethylformamide mixture was added 1.05 gm. powdered stannous chloride and 1.5 cc. acetyl chloride. The reaction mixture was stirred one-half hour in the cold, 3½ hours at room temperature, and then evaporated to dryness. Ethyl acetate was added and the mixture washed four times with cold 5 percent hydrochloric acid, twice with sodium bicarbonate solution, sodium chloride solution, dried over magnesium sulfate, filtered. Evaporation gave 690 mg. of a pale yellow oil. Crystallization of the oil from ethyl ether provided crystals of the title compound, m.p., 149°–152° C. The structure of the title compound was verified by I.R., U.V., and NMR spectra.

Analysis, Calc.: C, 56.37; H, 5.63; N, 9.29.
Found: C, 56.33; H, 5.66; N, 9.57.

EXAMPLE 4 t-Butyl 3-Formyl-7-phenoxyacetamido-3-cephem-4-carboxylate

To a cold solution of 860 mg. of tert-butyl 3-formyl-7-phenoxyacetamido-3-cephem-4-carboxylate-1-oxide in 20 cc. of 9:1 acetonitrile-water was added 860 mg. powdered stannous chloride and then 0.86 cc. acetyl chloride. After stirring with slow warming to room temperature over 2 hours, the reaction mixture was evaporated to dryness, taken up in ethyl acetate, washed four times with cold 5 percent hydrochloric acid, twice with sodium bicarbonate solution, once with sodium chloride solution, dried over magnesium sulfate, filtered and evaporated to give 600 mg. of yellow foam. This material was chromatographed on a column of silica gel — 15 percent H$_2$O. Elution with benzene/4 percent ethyl acetate and benzene/8 percent ethyl acetate provided the tert-butyl 3-formyl-7-phenoxyacetamido-3-cephem-4-carboxylate as an oil. The structure was confirmed by NMR spectrum, which exhibited a one-proton singlet at 9.86δ (aldehyde C-H) and an AB quarter centered of 3.63δ (two protons, $J_{AB}$ = 18 Hz).

A portion of this title material was treated for 1 hour with 98–100 percent formic acid. After evaporation to dryness, the residue 3-formyl-7-phenoxyacetamido-3-cephem-4-carboxylic acid displayed activity against *B. subtilis* on a bioautograph of a paper chromatogram.

EXAMPLE 5 p-Methoxybenzyl 3-formyl-7-phenoxyacetamido-3-cephem-4-carboxylate-1-oxide

To a cooled solution of 60 mg. of p-methoxybenzyl 3-hydroxymethyl-7-phenoxyacetamido-3-cephem-4-carboxylate-1-oxide in 20 cc. acetone was added six drops Jones reagent (26.72 gm. CrO$_3$/100 cc. solution in H$_2$SO$_4$). After 5 minutes in the cold, the volume was reduced on a rotary evaporator, ethyl acetate added, and the organic layer washed once with sodium chloride solution, twice with bicarbonate solution, once with sodium chloride solution, dried over magnesium sulfate, filtered, and evaporated to give 56 mg. of white amorphous solid, whose I.R., U.V., and NMR spectra were in excellent accord with the assigned structure.

This sulfoxide aldehyde was characterized as its O-methyl oxime, m.p., 210°–212° C., from methanol.

Analysis, Calc.: C, 56.92; H, 4.78; N, 7.97.
Found: C, 57.10; H, 4.59; N, 7.84.

EXAMPLE 6

The acid chloride of 7-(2'-thienylacetamido)-3-acetoxymethyl-Δ$^3$-cephem-4-carboxylic acid obtained by reaction thereof with oxalyl chloride in the presence of a small amount of N,N-dimethylformamide, was dissolved in methylene chloride and the solution was added to a stirred solution of triethylamine and tert-butyl alcohol in methylene chloride maintained at ice temperature. When addition was completed, the solution was washed with water and 3 percent hydrochloric acid and evaporated to dryness. The residue was dissolved in ethyl acetate and the solution washed with 5 percent sodium bicarbonate solution and treated with activated charcoal. The mixture was filtered and the solvent removed from the filtrate to give the tert-butyl 7-(2'-thienyl-acetamido)-3-acetoxymethyl-Δ$^2$-cephem-4-carboxylate ester (as described in detail in U.S. Pat. application Ser. No. 759,490, filed Sept. 12, 1968).

The tert-butyl 7-(2'-thienylacetamido)-3-acetoxymethyl-Δ$^2$-cephem-4-carboxylate ester is oxidized with m-chloroperbenzoic acid in isopropanol-methylene chloride to give the tert-butyl 7-(2-thienylacetamido)-3-acetoxymethyl-Δ$^3$-cephem-4-carboxylate-1-oxide.

The tert-butyl 7-(2'-thienylacetamido)-3-acetoxymethylΔ$^3$-cephem-4-carboxylate-1-oxide is treated with citrus acetylesterase by known procedures to obtain the tert-butyl 7-(2'-thienylacetamido)-3-hydroxymethyl-Δ$^3$-cephem-4-carboxylate-1-oxide.

The tert-butyl-7-(2'-thienylacetamido)-3-hydroxymethyl-Δ$^3$-cephem-4-carboxylate-1-oxide is oxidized using Jones reagent according to procedures described above to obtain the tert-butyl 7-(2'-thienylacetamido)-3-formyl-Δ$^3$-cephem-4-carboxylate-1-oxide of this invention.

Alternatively, the 7-(2'-thienylacetamido)-3-acetoxymethyl-Δ$^3$-cephem-4-carboxylic acid (cephalothin) is converted to the methyl ester with diazomethane. The methyl cephalothin ester is treated with 1 equivalent of sodium hydroxide in a 1:1 pyridine: water mixture at ice temperature to give the 7-(2'-thienylacetamido)-3-acetoxymethyl-Δ$^2$-cephem-4-carboxylic acid.

The 7-(2'-thienylacetamido)-3-acetoxymethyl-Δ$^2$-cephem-4-carboxylic acid is hydrolyzed in a mixture acetone and water with 1 N sodium hydroxide to give the 7-(2'-thienylacetamido)-3-hydroxymethyl-Δ$^2$-cephem-4-carboxylic acid. [J. Chem. Soc., Section C, 1142 (1966).]

The 7-(2'-thienylacetamido)-3-hydroxymethyl-Δ$^2$-cephem-4-carboxylic acid is treated with diphenyldiazomethane to give the benzhydryl 7-(2'-thienylacetamido)-3-hydroxymethyl-Δ$^2$-cephem-4-carboxylate ester.

The benzhydryl 7-(2'-thienylacetamido)-3-hydroxymethyl-Δ$^2$-cephem-4-carboxylate ester is oxidized with m-chloroperbenzoic acid or other peracid to form the benzhydryl 7-(2'-thienylacetamido)-3-hydroxymethyl-Δ$^3$-cephem-4-carboxylate-1-oxide.

The benzhydryl 7-(thiopheneacetamido)-3-hydroxymethyl-Δ$^3$-cephem-4-carboxylate-1-oxide is then oxidized to the benzhydryl 7-(2'-thienylacetamido)-3-formyl-Δ$^3$-cephem-4-carboxylate-1-oxide of this invention as described above.

The product of this example can be converted by sulfoxide reduction with potassium iodate-acetyl chloride or stannous chloride - acetyl chloride in DMF/acetonitrile to the 7-thiopheneacetamido-3-formyl-Δ$^3$-cephem-4-carboxylate ester, which is then treated with acid, e.g., 98–100 percent formic acid to remove the benzhydryl ester, to effect deesterification and provide antibiotically active material, 7-thiopheneacetamido-3-formyl-Δ$^3$-cephem-4-carboxylic acid.

EXAMPLE 7

The known compound, N-tert-butoxycarbonyl cephaloglycin is converted to the tert-butyl N-tert-butoxycarbonyl cephaloglycin ester via the acid chloride ketene reaction described above.

The tert-butyl N-tert-butoxycarbonyl cephaloglycin ester is oxidized to the sulfoxide by reaction with m-chloroperbenzoic acid.

The tert-butyl N-tert-butoxycarbonyl cephaloglycin sulfoxide ester is treated with orange peel esterase to form the tert-butyl 7-[D-$\alpha$-phenyl-$\alpha$-N-tert-butoxycarbonylamino)acetamido]-3-hydroxymethyl-$\Delta^3$-cephem-4-carboxylate-1-oxide.

The 7-[D-$\alpha$-phenyl-$\alpha$-(N-tert butoxycarbonylamino) acetamido]-3-hydroxymethyl-$\Delta^3$-cephem-4-carboxylate-1-oxide is oxidized with chromium trioxide in acetic acid to give the tert-butyl 7-[D-$\alpha$-phenyl-$\alpha$-(N-tert-butoxycarbonylamino)acetamido]-3-formyl-$\Delta^3$-cephem-4-carboxylate-1-oxide of this invention.

Alternatively, the tert-butyl 7-[D-$\alpha$-phenyl-$\alpha$-(N-tert-butoxycarbonylamino)acetamido]3-acetoxymethyl-$\Delta^3$-cephem-4-carboxylate can be treated first with orange peel esterase and then with the oxidizing agent, m-chloroperbenzoic acid to form the tert-butyl 7-[D-$\alpha$-phenyl-$\alpha$-(N-tert-butoxycarbonylamino)acetamido]-3-hydroxymethyl-$\Delta^3$-cephem-4-carboxylate-1-oxide starting material.

EXAMPLE 8

An n-blocked cephaloglycin, 7-[D-$\alpha$-phenyl-$\alpha$-(N-tert-butoxycarbonylamido)acetamido]3-acetoxymethyl-$\Delta^3$-cephem-4-carboxylic acid is treated with pyridine and acetic anhydride to form the 7-[D-$\alpha$-phenyl-$\alpha$-(N-tert-butoxycarbonylamido)acetamido]-3-acetoxymethyl-$\Delta^2$-cephem-4-carboxylic acid. (Alternatively, this material can be prepared by treatment of t-BOC cephaloglycin methyl ester with sodium hydroxide in aqueous tetrahydrofuran.) This latter compound is treated with sodium hydroxide in aqueous acetone to form the 7-[D-$\alpha$-phenyl-$\alpha$-(N-tert-butoxycarbonylamido)-acetamido]-3-hydroxymethyl-$\Delta^2$-cephem-4-carboxylic acid.

The 7-[D-$\alpha$-phenyl-$\alpha$-(N-tert-butoxycarbonylamino)-acetamido]-3-hydroxymethyl-$\Delta^2$-cephem-4-carboxylic acid is treated with diphenyldiazomethane to form the benzhydryl 7-[D-$\alpha$-phenyl-$\alpha$-(N-tert-butoxycarbonylamido)acetamido]-3-hydroxymethyl-$\Delta^2$-cephem-4-carboxylate ester which is treated with m-chloroperbenzoic acid to form the benzhydryl 7-[D-$\alpha$-phenyl-$\alpha$-(N-tert-butoxy-carbonylamido)acetamido]-3-hydroxymethyl-$\Delta^3$-cephem-4-carboxylate-1-oxide starting material.

The benzhydryl 7-[D-$\alpha$-phenyl-$\alpha$-(N-tert-butoxycarbonylamino)acetamido]-3-hydroxmethyl-$\Delta^3$-cephem-4-carboxylate-1-oxide is treated with chromium trioxide in acetic acid to form the benzhydryl 7-[D-$\alpha$-phenyl-$\alpha$-(N-tert-butoxycarbonylamino)-acetamido]-3-formyl-$\Delta^3$-cephem-4-carboxylate-1-oxide product of this invention.

This product can be used as an intermediate to prepare 7-(D-$\alpha$-amino-$\alpha$-phenylacetamido)-3-formyl-$\Delta^3$-cephem-4-carboxylate by reducing the sulfoxide as described above.

EXAMPLE 9

Benzhydryl 3-formyl-7-[2'-(2''-thienyl)acetamido]-$\Delta^3$-cephem-4-carboxylate-1-oxide.

To a cooled solution of 268 mg (0.5 millimole) benzhydryl 3-hydroxymethyl-7-[2'-(2''-thienyl)acetamido]-$\Delta^3$-cephem-4-carboxylate-1-oxide in 75 cc. acetone was added 0.35 cc. of Jones reagent. After one minute excess Jones reagent was quenched with isopropanol and the reaction mixture was evaporated to a small volume. Ethyl acetate was added. The resulting mixture was extracted twice with aqueous sodium chloride solution, once with aqueous sodium bicarbonate solution, and then with aqueous sodium chloride solution again. The washed ethyl acetate phase was separated from the last aqueous extraction solution and dried with magnesium sulfate, filtered and evaporated to obtain as residue 257 mg. of crude benzhydryl 3-formyl-7-[2'-(2''-thienyl)-acetamido]-$\Delta^3$-cephem-4-carboxylate-1-oxide. The nuclear magnetic resonance spectrum was consistent with this structure. Even after column chromatography this material failed to crystallize. It was characterized as its -methyloxime, m.p. 206°-7° C. from methanol. The elemental analysis was as follows:

| Element | Calcd. | Found |
|---|---|---|
| % C | 59.67 | 59.90 |
| % H | 4.47 | 4.66 |
| % N | 7.46 | 7.20 |

EXAMPLE 10

7-Acetamido-3-acetoxymethyl-$\Delta^3$-cephem-4-carboxylic acid is prepared by reacting 7-aminocephalosporanic acid (7ACA) with acetyl chloride. The 7-acetamido-3-acetoxymethyl-$\Delta^3$-cephem-4-carboxylic acid is treated with oxalyl chloride in the presence of a small amount of N,N-dimethylformamide to form the corresponding acid chloride as described in Example 6 above. The acid chloride of 7-acetamido-3-acetoxymethyl-$\Delta^3$-cephem-4-carboxylic acid is dissolved in methylene chloride and the solution is treated with tert-butanol and triethylamine as in Example 6 to form the tert-butyl 7-acetamido-3-acetoxymethyl-$\Delta^2$-cephem-4-carboxylate ester.

The tert-butyl 7-acetamido-3-acetoxymethyl-$\Delta^3$-cephem-4-carboxylate in oxidized with meta-chloroperbenzoic acid in isopropanol-methylene chloride to form the tert-butyl 7-acetamido-3-acetoxymethyl-$\Delta^3$-cephem-4-carboxylate-1-oxide.

The tert-butyl 7-acetamido-3-acetoxymethyl-$\Delta^3$-cephem-4-carboxylate-1-oxide is treated with citrus acetylesterase by known procedures to obtain the tert-butyl 7-acetamido-3-hydroxymethyl-$\Delta^3$-cephem-4-carboxylate-1-oxide.

The tert-butyl 7-acetamido-3-hydroxymethyl-$\Delta^3$-cephem-4-carboxylate-1-oxide is oxidized using Jones reagent according to procedures described above to form the tert-butyl 7-acetamido-3-formyl-$\Delta^3$-cephem-4-carboxylate-1-oxide of this invention. This new 3-formyl cephalosporin sulfoxide ester is useful as an intermediate in the preparation of cephalosporin antibiotic compounds. For example, this compound can be treated with methoxyamine hydrochloride in methanol containing some pyridine to form the tert-butyl 7-acetamido-3-methoxyiminomethyl-$\Delta^3$-cephem-4-carboxylate-1-oxide (the O-methyl oxime). The resulting oxime sulfoxide ester can be reduced to the sulfide state by known procedures, e.g., by treatment with stannous chloride in the presence of acetyl chloride to form the tert-butyl 7-acetyl-7-methoxyiminomethyl-$\Delta^3$-cephem-4-carboxylate. The acetyl side chain can be cleaved by treating the resulting compound with phosphorus pentachloride in the presence of an approximate equivalent amount of a tertiary amine such as pyridine, followed by treatment with methanol, and then with water to form the "nucleus" compound 7-amino-3-methoxyiminomethyl-$\Delta^3$-cephem-4-carboxylate. The nucleus compound can be re-acylated as such or as its p-toluenesulfonate salt with an acyl group known to contribute to good antibiotic activity in a cephalosporin, e.g., with 2-(2'-thienyl)acetyl chloride to form the tert-butyl 7-[2'-(2''-thienyl)acetamido] 3-methoxyiminomethyl-$\Delta^3$-cephem-4-carboxylate. Alternatively, the nucleus compound can be treated with phenoxyacetyl chloride to form the tert-butyl 7-phenoxyacetamido-3-methoxyiminomethyl-$\Delta^3$-cephem-4-carboxylate. The tert-butyl group can then be removed by treating this ester with formic acid to obtain the cephasporic acid antibiotic derivative, either 7-[2'-(2''-thienyl)acetamido]-3-methoxyiminomethyl-$\Delta^3$-cephem-4-carboxylic acid, or the 7-(phenoxyacetamido)-3-methoxyiminomethyl-$\Delta^3$-cephem-4-carboxylic acid, respectively.

The compound 3-methoxyiminomethyl-7-[2'-(2''-thienyl)-acetamido]-3-cephem-4-carboxylic acid was active as an antibiotic in inhibiting the growth of penicillin G resistant *Staphylococcus aureus* strain V41 at a concentration of 4.1 micrograms per milliliter (μg/ml.), strain V32 at 12.4 μg/ml, and strain V84 at 2.9 μg/ml, in the absence of human blood serum in a standard gradient plate agar dilution test. The compound inhibited the growth of the Gram negative organisms *Shigella* sp. (N9) at 16.3 μg/ml, *E. Coli*(X26) at 9.0 μg/ml, *Klebsiella pneumonia* (X86) at 10.3 μg/ml, and *Salmonella heidelburg*, (X514) at 9.4 μg/ml. The compound did not inhibit the growth of penicillin G and methicillin resistant *Staphyococcus aureus* (X400) at any concentration under 20 μg/ml. or the Gram negative organisms *Pseudomonas aeruginosa* (X528) and *Serratia marcescens* (X99) at any concentration lower than 50 μg/ml. in these tests.

EXAMPLE 11

The amino group of 7-aminocephalosporanic acid (7-ACA) is protected with a formyl group by reacting 7-ACA with the mixed anhydride formed by adding formic acid to acetic anhydride to form the 7-formamido-3-acetoxymethyl-Δ³-cephem-4-carboxylic acid. This acid is treated with oxalyl chloride to form the acid chloride, and the acid chloride is treated with tert-butanol and triethylamine to form the tert-butyl 7-formamido-3-acetoxymethyl -Δ²-cephem-4-carboxylate ester. This Δ²-cephalosporin ester is oxidized with a m-chloroperbenzoic acid to form tert-butyl 7-formamido--3-acetoxymethyl-Δ³-cephem-4-carboxylate-1-oxide. This Δ³ cephalosporin sulfoxide ester is treated in the manner described in Example 10 to form the tert-butyl 7-formamido-3-formyl-Δ³-cephem-4-carboxylate-1-oxide, of this invention. This compound is useful as an intermediate in the manufacture of cephalosporin antibiotics. It can be treated to functionalize the 3-formyl group, e.g., with methoxyamine hydrochloride to form the tert-butyl 7-formamido-3-methoxyiminomethyl-Δ³-cephem-4-carboxylate-1-oxide, the sulfoxide can be reduced, the formyl group can be cleaved from the 7-amino nitrogen by treatment of the reduced ester with mineral acid at −16° to 100° C, and the resulting nucleus ester can be treated as described in example 10 to form the antibiotic compound.

EXAMPLE 12

Following the alternative procedure of Example 6, 7-acetamido-3-acetoxymethyl-Δ³-cephem-4-carboxylic acid, prepared, e.g., by reacting 7-aminocephalosporanic acid with acetyl chloride, is converted through a series of steps to benzhydryl 7-acetamido-3-formyl-Δ³-cephem-4-carboxylate-1-oxide. This compound is useful as an intermediate in the synthesis of cephalosporin antibiotics as indicated above.

This invention also contemplates the preparation of new 3-formyl cephalosporin sulfoxide esters in which the 7-amino group is protected by $C_2$ to $C_6$-haloalkanoyl substituents; particularly the alpha-chloro or alpha-bromalkanoyl groups, e.g., 2-chloroacetyl. After the 3-formyl group has been converted to the desired nucleophilic group, and the sulfoxide has been reduced, these 7-haloalkanoyl acyl groups can be removed by the known $PCl_5$-pyridine/$CH_3OH$/ $H_2O$ procedures. The 2-chloroacetyl group can also be removed by the use of thiourea.

When used for in vivo antibiotic therapy it is contemplated that the antibiotic compound obtained from the 3-formyl-Δ³-cephem-4-carboxylate ester sulfoxides of this invention would be formulated and administered in dosage forms which depend upon the weight of the subject, the nature of the infection being treated, and the mode of administration. Some of such cephalosporins are most efficiently effective when administered by intramuscular or intravenous injection in which case about 250 mg. to about 1,000 mg. of the compound would be dissolved in a suitable isotonic solvent for injection of the solution. Other such cephalosporin antibiotics can be administered orally in tablet or capsule form containing doses of from about 125 mg. to about 500 mg. of the desired antibiotic.

I claim:

1. A compound of the formula

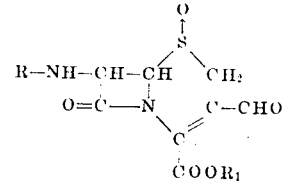

wherein R is a $C_1$ to $C_6$-alkanoyl, or an acyl group of the formula

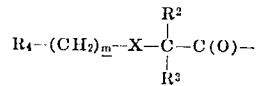

wherein $m$ is an integer of from 0 to 4,

X is oxygen, sulfur, or a chemical bond, $R^2$ and $R^3$ are, separately, hydrogen or methyl, or $R^2$ is hydrogen and $R^3$ is amino protected with benzyloxycarbonyl, tert-butoxycarbonyl, or the enamine from methyl acetoacetate;

$R^4$ is thienyl or phenyl, or phenyl substituted with fluorine, chlorine, bromine, iodine, methyl, ethyl, hydroxy, methoxy, ethoxy, nitro, cyano, or trifluoromethyl, $R^1$ is $C_4$ to $C_6$-tert-alkyl, $C_5$ to $C_7$-tert-alkenyl, $C_5$ to $C_7$-tert-alkynyl, 2,2,2-trichloroethyl, benzyl, benzhydryl, methoxybenzyl nitrobenzyl, phenacyl, phthalimidomethyl, or succinimidomethyl.

2. A compound as defined in claim 1 wherein R is an acyl radical in which $m$ is 0, X is oxygen, $R^2$ and $R^3$ are each hydrogen, and $R^4$ is phenyl, and $R^1$ is $C_4$ to $C_6$-tert-alkyl.

3. A compound as defined in claim 2 wherein the compound is tert-butyl 3-formyl-7-phenoxyacetamido-Δ³-cephem-4-carboxylate-1-oxide.

4. A compound as defined in claim 1 wherein R is an acyl group in which $m$ is 0, $R^2$ and $R^3$ are each hydrogen, $R^4$ is phenyl, and $R^1$ is methoxybenzyl.

5. A compound as defined in claim 4 wherein the compound is p-methoxybenzyl 3-formyl-7-phenoxyacetamido-Δ³-cephem-4-carboxylate-1-oxide.

6. A compound as defined in claim 1 wherein the compound is benzhydryl 3-formyl-7-(2'-thienylacetamido)-Δ³-cephem-4-carboxylate-1-oxide.

7. A compound as defined in claim 1 where the compound is a $C_4$ to $C_6$-tert-alkyl 3-formyl-7-(2'-thienylacetamido)-Δ³-cephem-4-carboxylate-1-oxide.

8. A compound as defined in claim 1 wherein the compound is benzhydryl 3-formyl-7-[D-α-phenyl-α-(N-tert-butoxy-carbonylamido)acetamido]-Δ³-cephem-4-carboxylate-1-oxide.

9. A compound as defined in claim 1 wherein the compound is a $C_4$ to $C_6$-tert-alkyl 3-formyl-7-[D-α-phenyl-α-(N-tert-butoxycarbonylamino)acetamido]Δ³-cephem-4-carboxylate-1-oxide.

10. A compound as defined in claim 1 in which R is a $C_1$ to $C_6$-alkanoyl, and $R^1$ is benzhydryl.

11. A compound as defined in claim 10 in which the compound is benzhydryl 7-acetamido-3-formyl-Δ³-4-carboxylate-1-oxide.

* * * * *

Disclaimer 3,674,784.—*J. Alan Webber*, Indianapolis, Ind. 3-FORMYL CEPHALO-SPORIN SULFOXIDES. Patent dated July 4, 1972. Disclaimer filed Mar. 13, 1972, by the inventor, the assignee, *Eli Lilly and Company*, assenting.

Hereby disclaims the portion of the term of the patent subsequent to Aug. 3, 1988.

[*Official Gazette October 3, 1972.*]

UNITED STATES PATENT OFFICE
CERTIFICATE OF CORRECTION

Patent No. 3,674,784      Dated July 4, 1970

Inventor(s) J. Alan Webber

It is certified that error appears in the above-identified patent and that said Letters Patent are hereby corrected as shown below:

Column 12, in Claim 1, in the lines approximating lines 11 to 18, the structural formula should read:

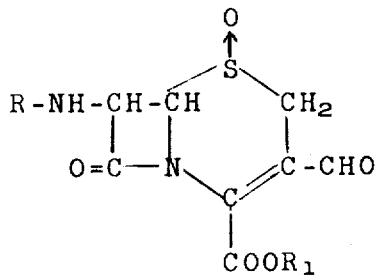

Signed and sealed this 6th day of February 1973.

(SEAL)
Attest:

EDWARD M. FLETCHER, JR.
Attesting Officer

ROBERT GOTTSCHALK
Commissioner of Patents